M. SWEET.

CURRY-COMBS.

No. 7,822. Reissued July 31, 1877.

Witnesses

J. J. Mason

D. R. Cowl

Inventor:

Miles Sweet by E. E. Massow, atty.

N. PETERS, PHOTO-LITHOGRAPHER, WASHINGTON, D. C.

UNITED STATES PATENT OFFICE.

MILES SWEET, OF TROY, NEW YORK.

IMPROVEMENT IN CURRY-COMBS.

Specification forming part of Letters Patent No. 89,182, dated April 20, 1869; reissue No. 7,822, dated July 31, 1877; application filed June 11, 1877.

DIVISION C.

*To all whom it may concern:*

Be it known that I, MILES SWEET, of Troy, in the county of Rensselaer and State of New York, have invented certain new and useful Improvements in the Construction of Curry-Combs; and that the following is a full, clear, and exact description of the same, reference being had to the accompanying drawings, making a part of this specification, in which—

Figure 1:
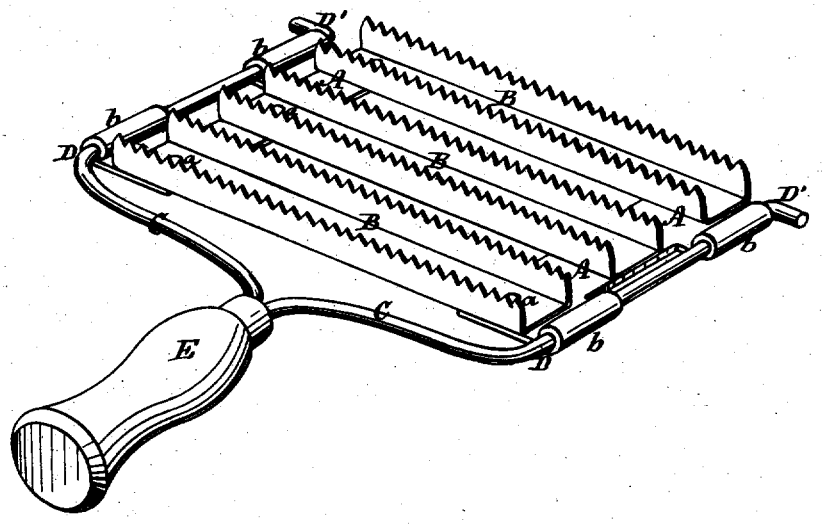
Figure 2:
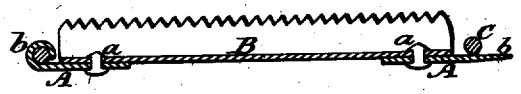
Figure 3:
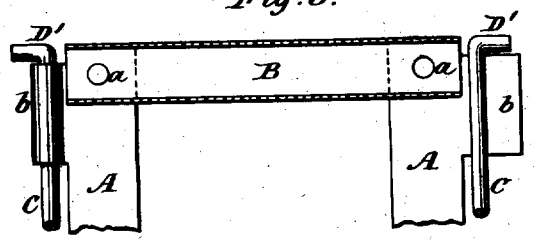

Figure 1 represents, in perspective, the face of a curry-comb having my improvements in connection with wrought-metal end bars. Fig. 2 represents a vertical section of the same, with one of the lug-blanks of the end bars left open, while the other is coiled around the shank-frame. Fig. 3 represents a top view of the same.

Similar letters of reference denote like parts in all the figures.

My invention is designed to improve the mode of constructing curry-combs of a class an example of which is shown in Patent No. 6,181, granted 13th March, 1849.

My invention consists in sheet-metal end pieces for attaching or securing a series or set of comb-bars to the shank-frame of curry-combs, said plates constituting transverse connecting end bars or end pieces of sheet metal, provided with lugs or extensions, that can be wrapped around the wire frame that connects the body of the comb to the handle, namely, in such a way that the ends of the lugs shall not quite touch the flat part of the end piece, thus enabling me to so tightly wrap the wire frame with the lugs that they will hold it very firmly without using any rivet for that purpose.

In the drawings, A represents the wrought-metal end pieces; B, the comb-bars; C, the wire handle-frame uniting the body of the comb to the handle E, and *a* the rivets uniting the comb-bars to the end pieces. The end bars or end pieces A are made of sheet metal, and they can be cut from the sheet by dies, or in any desired manner, and are provided with projecting lugs *b*, designed to be bent up to inclose a portion of the wire frame. The right side of Figs. 2 and 3 shows the end piece and its lug before said lug is bent around the wire frame, while the left side of said figures shows it bent around and clasping the wire frame of the comb, where it is retained by bending the wire of the frame and extending it outward adjacent to said lugs at D and D′, the operation being much more expeditive than adjusting, filing, and then riveting the extremity of the wire, as shown in the aforesaid patent of 1849.

What I claim as my invention, and desire to secure by Letters Patent, is—

The end pieces A, with projecting lugs *b*, cut from sheet metal, for the purpose specified.

MILES SWEET.

Witnesses:
ALVAH TRAVER,
J. W. PALMER.